2,981,626
STABLE SWEETENED CREAM PRODUCT

Arjen Tamsma, Arlington, Va., assignor to the United States of America as represented by the Secretary of Agriculture No Drawing. Filed May 6, 1957, Ser. No. 657,463

2 Claims. (Cl. 99—55)

(Granted under Title 35, U.S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

Milk and cream consist of fat, nonfat milk solids, and water. Fat and nonfat milk solids are sometimes referred to collectively as milk solids. Cream differs from milk chiefly in that it contains a much higher percentage of fat and a lower percentage of nonfat milk solids and water. Cream is usually defined as that portion of milk, rich in milk fat, which rises to the surface of milk on standing, or is separated from it by centrifugal force. It contains not less than 18% of milk fat whereas milk contains 4.0% as an average.

Milk and cream are highly perishable and will keep only a week or two even under refrigeration.

The present invention relates to a stable sweetened cream product in which the sugar-in-water percentage is sufficiently high to produce an osmotic pressure of magnitude that microorganisms will not grow and to a method for producing same. More specifically, this invention relates to a sweetened cream product which is designated as a sweetened cream product because it contains more than 18% of milk fat, and to the processes whereby it is prepared.

Sweetened condensed milk is a well-known dairy product which has excellent food properties and which keeps well during prolonged periods of storage without refrigeration. It is made from milk by removal of part of the water in a vacuum pan and addition of sufficient sugar to prevent growth of microorganisms. The product is objected to by some people as being excessively sweet.

A similar product, sweetened condensed cream, would be very useful. Millions of pounds of milk fat are preserved each year in the United States in the form of frozen cream for use, primarily by the baking and ice cream industries, during the winter months. Freezing adds to the cost and considerable deterioration occurs causing the development of off-flavors and changes in the physical state of the fat and protein. Hence, a better and less expensive method whereby milk fat could be preserved from a period of milk surplus to one of scarcity would be of value to the dairy industry.

I have discovered a process whereby a stable, high-fat-content, sweetened cream product which has excellent physical properties and which keeps well without refrigeration can be prepared simply and economically.

In accordance with this invention, whole milk is separated to obtain cream with a fat content of about 50 to 80%. This can be done in one step or in two steps in which cream from the first separation is heated and separated to increase its fat-content to the desired percentage. Nonfat dry milk is stirred into the warm cream until a uniform dispersion is achieved.

The amount of nonfat dry milk added is that calculated to give a nonfat milk solids to fat ratio about equal to that of conventional creams. The mixture is pasteurized and sucrose is added to produce a sugar-in-water ratio or concentration of 60–65%. Alternatively, the sugar may be added before pasteurization. Dry whole milk may be used instead of nonfat dry milk.

Although the new product resembles sweetened condensed milk in appearance, flavor, and consistency, it is considerably less sweet because, with a milk solids content of about 50%, as compared with 28% for sweetened condensed milk, the water content of the present product is lower and therefore less sugar is needed to attain the sugar-in-water ratio (60–65%) necessary for self preservation.

Since the fat content, ranging from 30 to 50% and averaging 40%, is about 5 times as great as in sweetened condensed milk, the product provides a means of preserving milk-fat from a period of milk surplus to one of scarcity.

Obvious uses for this new product are in ice cream, in bakery products, in coffee, in candy, and as a topping. Upon appropriate dilution with water the product can be whipped just like the corresponding mixture of fresh cream and sugar.

The following examples are presented in illustration of the practice of this invention and are not intended as a restriction:

*Example 1.*—To 100 pounds of cream that contains 65% fat, at 50° C., is added 11.0 pounds of nonfat dry milk. This brings the nonfat milk solids to fat (NFMS:F) ratio up from about 0.05 to 0.21 as it is for cream with 30% fat content. The mixture is heated to 90° C., whereupon it is cooled to 60° C. and 55.0 pounds of sucrose is added and dissolved. This gives a sugar to sugar+water ratio of 1:1.58 or, in terms of percent, 63.1. The final product contains 39.2% fat, 8.3% nonfat milk solids, 33.1% sugar, and 19.4% water. It consists of 66.9% concentrated cream and 33.1% sugar. The degree of concentration for the cream is about double that of cream with 30% fat content. From 100 pounds of the product diluted with 63.8 pounds of water is obtained the equivalent of 130.7 pounds of cream of 30% fat content with 33.1 pounds of sucrose added.

Similar products, on the basis of cream with various fat contents, can be made by starting with cream of other fat contents and adding different amounts of nonfat dry milk and sucrose.

*Example 2.*—To 100 pounds of cream that contains 60% fat, at 50° C., is added 18.6 pounds of nonfat dry milk. This brings the NFMS:F ratio up from 0.06 to 0.36 as it is for cream with 20% fat content. The mixture is heated to 90° C., whereupon it is cooled to 60° C. and 62.8 pounds of sucrose is added and dissolved. This gives a sugar to sugar-in-water percentage of 62.9. The final product contains 33.1% fat, 11.9% nonfat milk solids, 34.6% sugar, and 20.4% water. It consists of 65.4% concentrated cream and 34.6% sugar. The degree of concentration for the cream is about 2½ times that of cream with 20% fat content. From 100 pounds of the product diluted with 100.4 pounds of water is obtained the equivalent of 165.8 pounds of cream of 20% fat content with 34.6 pounds of sugar added.

*Example 3.*—To 100 pounds of cream that contains 70% fat, at 50° C., is added 7.0 pounds of nonfat dry milk. This brings the NFMS:F ratio up from 0.04 to 0.13 as it is for cream with 40% fat content. The mixture is heated to 90° C., whereupon it is cooled to 60° C. and 46.8 pounds of sucrose is added and dissolved. This gives a sugar to sugar-in-water percentage of 63.0. The final product contains 45.5% fat, 6.2% nonfat milk solids, 30.4% sugar, and 17.9% water. It consists of 69.6% concentrated cream and 30.4% sugar. The degree of concentration for the cream is about 1⅔ times that of cream with 40% fat content. From 100 pounds of the product diluted with 44.0 pounds of water is obtained the equivalent of 113.6 pounds of cream of 40% fat content with 30.4 pounds of sugar added.

While I have given specific temperature conditions for pasteurizing the product, I do not limit myself to them. The primary purpose of pasteurizing a liquid food is to destroy any pathogenic organisms that may be present as well as to reduce the viable microbial content to a low figure. In carrying out my process neither the time-temperature conditions nor the manner of attaining them during the heat treatment is considered restrictive. In the pasteurization of market milk 143° F. (61.6° C.) for 30 minutes or its lethal equivalent, such as 161° F. (71.6° C.) for 15 seconds, are minimum conditions. In the pasteurization of my product it is advisable and desirable to exceed these time-temperature minima in order to insure attainment of the corresponding lethal effect.

In like manner I am not restricted to the sequence in the process for adding the sucrose or the extra milk solids to the cream. These solids may be added before or after pasteurization or at any time during this step. Although excellent products have been prepared and packaged under atmospheric conditions, the development of off-flavors can be further minimized by reducing the amount of air in the product for storage purposes.

This can be accomplished by drawing the pasteurized, but still hot, modified sweetened cream into a vacuum chamber and then filling and closing the cans or other suitable containers in such a way as to have a low level of oxygen in the food product. Another way is to fill the containers with the hot pasteurized liquid so that there will be a minimum of head space after the covers have been sealed on in a vacuum chamber. On cooling there will be a partial vacuum in the head space of each container. This will help to keep the air content of the modified sweentened cream at a low level.

As illustrated by the foregoing examples, a final product having a certain desired composition may be prepared by starting with any cream and adding calculated amounts of nonfat milk solids and sucrose. As in sweetened condensed milk a sugar-in-water ratio of 63-65% gives the best preserving action.

Although cream can be separated from milk by other procedures, centrifugation is preferred because it is a continuous, economical, and practical means of achieving the desired level of fat content in the cream. Special centrifugal separators are available which produce cream containing as high as 83% of milk fat. The product prepared in this manner has excellent flavor and keeping qualities, especially if the nonfat milk solids are also selected on the basis of high quality products. The product from Example 1 was unchanged after storage without refrigeration for periods up to six months.

While the products described were prepared from cows' milk, the process is considered applicable to the preparation of sweetened cream products starting with cream from animals other than the cow. Related applications could include the preparation of sweetened stable fat products in which the fat source, either cream, other animal fat, vegetable oil, or combinations of these fats, is stabilized with animal or vegetable protein, especially, as an example of the latter, soybean protein.

The nonfat milk solids in water percentages $$\left(\frac{NFMS}{NFMS + \text{water}} \times 100\right)$$

of the product for Examples 1, 2, and 3 are approximately 30, 37, and 26 respectively. Limitations are about 15–45 percent. It was found that this range of percentage is important for physical stability of the product. At 30 percent, little or no de-emulsification of the fat or crystallization of lactose occurs during storage of a product having a NFMS:F ratio 0.21 for six months at room temperature. Below 30% the tendency for de-emulsification increases; above 30% it decreases.

As disclosed previously, I prefer to add nonfat milk solids such as nonfat dry milk to give a NFMS:F ratio of 0.1 to about 0.4 as in conventional cream because the tendency for de-emulsification also increases with decrease in the NFMS:F ratio.

Above 30% of nonfat milk solids in water the tendency for lactose crystallization increases with increase in percentage. In a product, as that of Example 2, in which one might anticipate eventual crystallization, accelerated lactose crystallization, as in the making of condensed milk, will cause small, instead of large, crystals of alpha lactose hydrate to form and sandiness will be avoided. Alternatively, crystallization of lactose can be minimized or prevented by adding nonfat milk solids in which the lactose percentage is lower than usual due to the removal of part of the lactose by crystallization and centrifugation or to hydrolysis or both.

Hydrolyzed lactose can replace part of the sucrose for preserving action.

In the foregoing description the term "sugar" is used to designate the total sucrose-plus-lactose content.

I claim:

1. A process for preparing a stable sweetened cream product comprising removing water from a member selected from the group consisting of milk and cream, recovering a cream containing about 50–80% milk fat, adding to said cream and intimately dispersing therein about 10–40% of the weight of said milk fat of nonfat milk solids, dissolving in the cream-nonfat milk solids mixture a quantity of sucrose sufficient to establish a sugar to sugar-plus-water ratio of about 60–65%, and pasteurizing the sweetened cream-nonfat milk solids mixture.

2. A process for preparing a stable sweetened cream product comprising removing water from a member selected from the group consisting of milk and cream, recovering a cream containing about 50–80% milk fat, adding to said cream and intimately dispersing therein about 10–40% of the weight of said milk fat of nonfat milk solids, pasteurizing the cream-nonfat milk solids mixture, and dissolving in said mixture a quantity of sucrose sufficient to establish a sugar to sugar-plus-water ratio of about 60–65%.

References Cited in the file of this patent

UNITED STATES PATENTS

| | | |
|---|---|---|
| 602,315 | Fernandez | Apr. 12, 1898 |
| 694,100 | Hall | Feb. 25, 1902 |
| 2,710,808 | Peebles et al. | June 14, 1955 |

OTHER REFERENCES

Herrington: Milk and Milk Processing, New York, 1948, pp. 166 to 178.

Hunziker: Condensed Milk and Milk Powder, 7th edition, La Grange, Ill., 1949, pp. 175 to 183.